Patented Jan. 18, 1927.

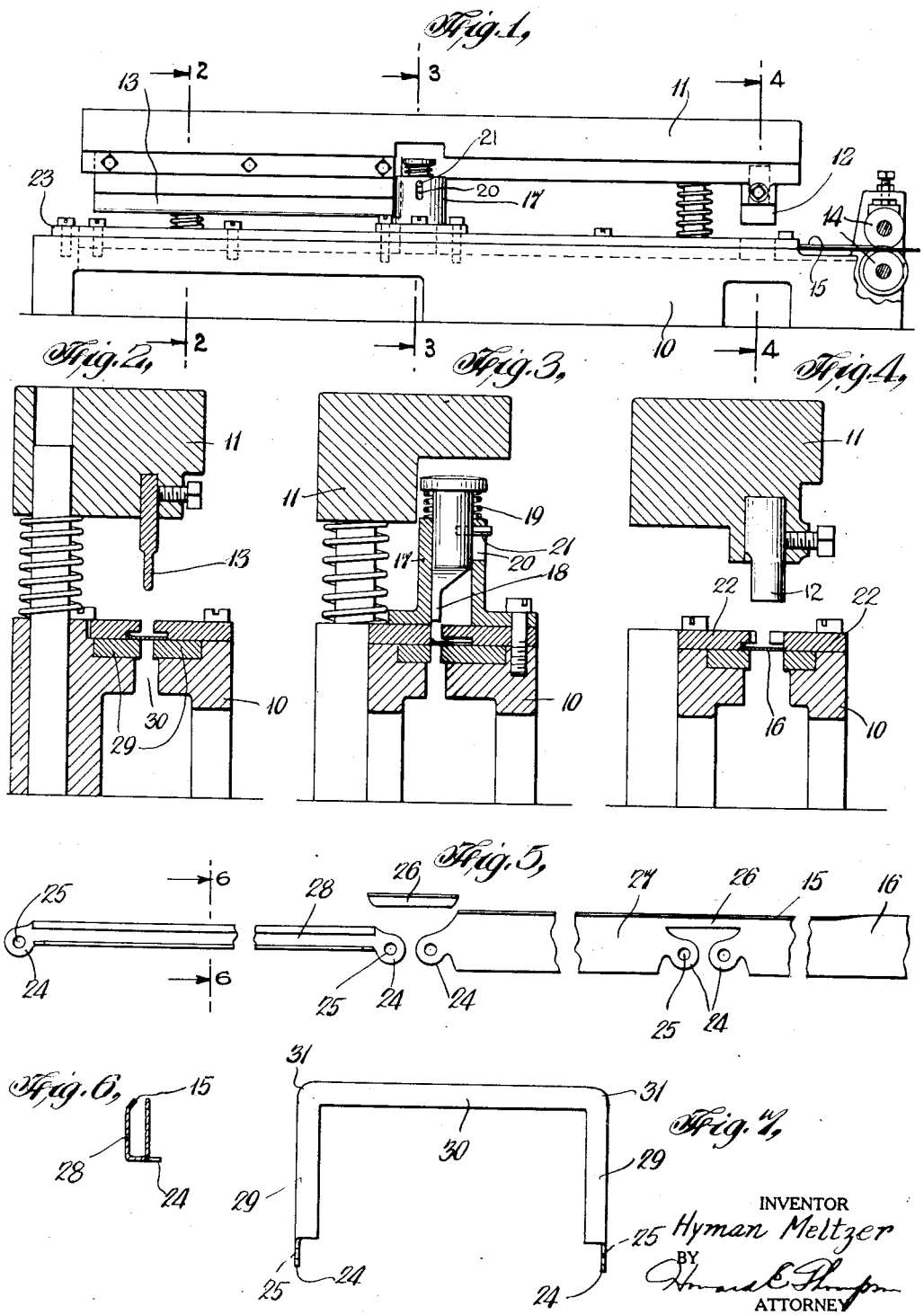

1,614,750

UNITED STATES PATENT OFFICE.

HYMAN MELTZER, OF BROOKLYN, NEW YORK.

METHOD AND APPARATUS FOR MANUFACTURING FRAME PARTS.

Application filed May 20, 1926. Serial No. 110,416.

This invention relates to the manufacture of frame parts and particularly the frame parts of pocketbooks, vanity cases and the like; and the object of the invention is to provided an improved method and apparatus for manufacturing such parts in a simple, effective and efficient manner; a further object being to provide an apparatus into which a long strip of sheet metal is fed and first fashioned to turn up one edge thereof and then fashioned at spaced intervals to form a pair of apertured ears, a portion of the strip being unsevered in this operation to retain said ears in connected relation and further in severing a workpiece of predetermined length from the strip and having at each end thereof projecting apertured ears and fashioning a severed workpiece into channeled formation, and further in bending the workpiece into substantially U-shaped formation to produce said frame part; a further object being to provide an apparatus with a cutter or severing device which is independent of the channel forming die and actuated on the descent of the plunger to sever a workpiece from the strip material employed slightly in advance of the engagement of the channeled forming die therewith; and with these and other objects in view, the invention consists in an apparatus of the class and for the purpose specified, and in the method hereinafter more fully described and claimed.

The invention is fully disclosed in the following specification, of which the accompanying drawing forms a part, in which the separate parts of my improvement are designated by suitable reference characters in each of the views, and in which:—

Fig. 1 is a diagrammatic view illustrating the several mechanisms of the apparatus employed in forming channeled workpieces from which frame parts are formed.

Fig. 2 is a partial section on the line 2—2 of Fig. 1.

Fig. 3 is a partial section on the line 3—3 of Fig. 1.

Fig. 4 is a partial section on the line 4—4 of Fig. 1.

Fig. 5 is a plan view of the strip indicating the several operations performed thereon in the production of a channel workpiece.

Fig. 6 is a section on the line 6—6 of Fig. 5; and,

Fig. 7 is a side view of a frame part fashioned from the channeled workpiece indicated at the left of Fig. 5 of the drawing and showing the last step in the method of forming the frame parts.

In Fig. 1 of the drawing, I have indicated at 10, the bed plate or table of a press of any kind or class. At 11, I have indicated the plunger of the press in connection with which is supported an ear forming tool or die 12 and a channel forming die 13; at the right of the plunger 11 and die 12 thereon are rollers 14 for forming a slightly inturned flange 15 on a strip 16 of sheet metal or similar material from which frame parts are to be formed. Movably mounted in connection with a block or other support 17 is a cut-off tool 18 normally held in raised position by a spring 19 and which is adapted to be struck by the plunger 11 and moved into engagement with the strip to sever workpieces therefrom slightly in advance of the engagement of the die 13 with the workpiece. The tool 18 is provided with a pin 21 and the support 17 with an elongated slot 20 through which the pin 21 is adapted to pass to guide said tool in its movement through the block 17 and to retain the tool against displacement from the block.

Upon the table or bed plate 10 of the press and in alinement with the tools and dies are workpiece guide rails 22 between which the strip 16 is fed into the apparatus, the end of the strip being moved into engagement with a stop 23 provided on the bed plate 10 to properly position the fashioned and severed workpiece beneath the channel forming die 13.

In Fig. 5 of the drawing, I have illustrated the successive steps of fashioning the strip 16 in the production of a channeled workpiece or frame part, the first step consisting in forming the flange 15 by the rollers 14 as previously stated, then forming by the tool or die 12 a pair of ears 24 having apertures 25, the ears being severed from each other as far as the ears proper are concerned, but the same being held together at this stage of the operation by a connecting bridge or coupling portion 26 on the strip 16. Preferably adjacent the flange side 15 thereof, the bridge portion 26 serves to retain the part 27 integral with the remainder of the strip 16 to permit of the feeding of the part 27 into position beneath the die 13. When in the last named position, the descent of the plunger will operate to sever the bridge piece 26 to form an independent workpiece 28 having the apertured ears 24 at each end thereof as seen in Fig. 5 of the drawing. On the further descent of the plunger, the die 13 engages the workpiece 28 and forces the same downwardly through spaced die blocks 29 on the bed 10 of the press and through an opening 30 provided in the bed through which the channeled workpiece 28 is discharged into a tray or other receiver. The channeled cross sectional form of the workpiece 28 is seen in Fig. 6 of the drawing. The next and last step in the operation of forming the frame part consists in shaping the workpiece 28 to the desired frame formation for use in connection with pocketbooks, vanity cases and like articles of predetermined contour. In the construction shown, the workpiece 28 is fashioned by bending the end portions 29 thereof at right angles to the central portion 30 as seen at 31 to form a substantially U-shaped frame part, the channel of which is directed inwardly, and the ears 24 of which being arranged in common horizontal alinement. The bending of the workpiece 28 to form the frame part as seen in Fig. 7 of the drawing may be accomplished in the usual or any desired manner.

With my improved method of production, it will be apparent that the resulting workpiece or frame part will have clean cut edges throughout and especially on the ears 24, which result is accomplished by employing the bridge piece 26, and the manner of severing the same from the strip as shown and described. It will be understood that my invention is not necessarily limited to the production of frame parts of any particular dimensions or contour, nor am I necessarily limited to the particular dies and tools employed, and various other changes in and modifications of the apparatus and method herein described may be made within the scope of the appended claims without departing from the spirit of my invention or sacrificing its advantages.

Having fully described my invention, what I claim as new and desire to secure by Letters Patent, is:—

1. An apparatus of the class described comprising a bed plate, a plunger movable toward and from the bed plate, spaced dies on said plunger, means on the bed plate for guiding a strip of sheet metal thereover and in alinement with the dies on said plunger, one of said dies being adapted to form at spaced intervals on said sheet metal strip, pairs of ears, one side edge of the strip being retained integral adjacent said ears to form a bridge portion, a cut-off tool adjacent the other of said dies and adapted to be actuated in the descent of the plunger to sever said bridge portions to form independent workpieces having ears at the ends thereof, and said last named die being adapted to engage the independent workpieces and to fashion the same intermediate the ears thereof into channel formation.

2. An apparatus of the class described comprising a bed plate, a plunger movable toward and from the bed plate, spaced dies on said plunger, means on the bed plate for guiding a strip of sheet metal thereover and in alinement with the dies on said plunger, one of said dies being adapted to form at spaced intervals on said sheet metal strip, pairs of ears, one side edge of the strip being retained integral adjacent said ears to form a bridge portion, a cut-off tool adjacent the other of said dies and adapted to be actuated in the descent of the plunger to sever said bridge portions to form independent workpieces having ears at the ends thereof, said last named die being adapted to engage the independent workpieces and to fashion the same intermediate the ears thereof into channel formation, and means in advance of the first named die for forming an inturned flange on one edge of said strip prior to the forming of the pairs of ears therein.

3. An apparatus of the class described comprising a bed plate, a plunger movable toward and from the bed plate, spaced dies on said plunger, means on the bed plate for guiding a strip of sheet metal thereover and in alinement with the dies on said plunger, one of said dies being adapted to form at spaced intervals on said sheet metal strip, pairs of ears, one side edge of the strip being retained integral adjacent said ears to form a bridge portion, a cut-off tool adjacent the other of said dies and adapted to be actuated in the descent of the plunger to sever said bridge portions to form independent workpieces having ears at the ends thereof, said last named die being adapted to engage the independent workpieces and to fashion the same intermediate the ears thereof into channel formation, means in advance of the first named die for forming an inturned flange on one edge of said strip prior to the forming of the pairs of ears therein, and the bed of the press being apertured beneath the second named die to permit of the passage of the channeled workpieces therethrough.

4. An apparatus of the class described comprising a bed plate, a plunger movable toward and from the bed plate, spaced dies on said plunger, means on the bed plate for guiding a strip of sheet metal thereover and in alinement with the dies on said plunger, one of said dies being adapted to form at spaced intervals on said sheet metal strip, pairs of ears, one side edge of the strip being retained integral adjacent said ears to form a bridge portion, a cut-off tool adjacent the other of said dies and adapted to be actuated in the descent of the plunger to sever said bridge portions to form independent workpieces having ears at the ends thereof, said last named die being adapted to engage the independent workpieces and to fashion the same intermediate the ears thereof into channel formation, means in advance of the first named die for forming an inturned flange on one edge of said strip prior to the forming of the pairs of ears therein, and said cut-off tool having tensional means for normally holding the same in a raised position.

5. An apparatus of the class described comprising a bed plate, a plunger movable toward and from the bed plate, spaced dies on said plunger, means on the bed plate for guiding a strip of sheet metal thereover and in alinement with the dies on said plunger, one of said dies being adapted to form at spaced intervals on said sheet metal strip, pairs of ears, one side edge of the strip being retained integral adjacent said ears to form a bridge portion, a cut-off tool adjacent the other of said dies and adapted to be actuated in the descent of the plunger to sever said bridge portions to form independent workpieces having ears at the ends thereof, said last named die being adapted to engage the independent workpieces and to fashion the same intermediate the ears thereof into channel formation, means in advance of the first named die for forming an inturned flange on one edge of said strip prior to the forming of the pairs of ears therein, said cut-off tool having tensional means for normally holding the same in a raised position, and means for guiding said tool in its movement.

6. The herein described method of manufacturing frame parts which consists in fashioning a strip of metal at predetermined intervals to form pairs of spaced ears and a bridge portion adjacent said ears, severing the bridge portion from the strip to form workpieces having ears at each end thereof, and then fashioning the workpieces intermediate the ears into channel formation in cross section.

7. The herein described method of manufacturing frame parts which consists in feeding an elongated strip of sheet metal into a machine, fashioning the strip at spaced intervals to form pairs of spaced ears and parts independent of and bridging the space between said ears, severing said parts adjacent said ears to form independent workpieces having ears at the ends thereof, and shaping the workpieces intermediate the ears into predetermined cross sectional form.

8. The herein described method of manufacturing frame parts which consists in feeding an elongated strip of sheet metal into a machine, fashioning one side edge of said strip to form an inturned flange, fashioning the strip at spaced intervals to form pairs of spaced ears and parts independent of and bridging the space between said ears, severing said parts adjacent said ears to form independent workpieces having ears at the ends thereof, and shaping the workpieces intermediate the ears into predetermined cross sectional form.

In testimony that I claim the foregoing as my invention I have signed my name this 18th day of May, 1926.

HYMAN MELTZER.